United States Patent
Kulkarni et al.

(10) Patent No.: US 10,284,244 B1
(45) Date of Patent: May 7, 2019

(54) METHOD AND APPARATUS FOR COUPLING ONE OR MORE TRANSCEIVERS TO A PLURALITY OF ANTENNAS

(71) Applicant: Motorola Mobility LLC, Chicago, IL (US)

(72) Inventors: Jatin Kulkarni, Naperville, IL (US); Armin Klomsdorf, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/989,086

(22) Filed: May 24, 2018

(51) Int. Cl.
*H04B 1/18* (2006.01)
*H04B 1/00* (2006.01)
*H04B 7/0413* (2017.01)
*H04W 16/14* (2009.01)

(52) U.S. Cl.
CPC ........... *H04B 1/18* (2013.01); *H04B 1/006* (2013.01); *H04B 1/0064* (2013.01); *H04B 7/0413* (2013.01); *H04W 16/14* (2013.01)

(58) Field of Classification Search
CPC ........ H04L 1/0031; H03F 3/195; H01Q 1/523
USPC ........ 455/340, 245.1, 78; 375/318, 376, 347
See application file for complete search history.

(56) References Cited

U.S. PATENT DOCUMENTS

| | | | |
|---|---|---|---|
| 2017/0005385 A1* | 1/2017 | Khlat | H04B 1/006 |
| 2018/0184337 A1* | 6/2018 | Jin | H04L 12/2863 |
| 2018/0191067 A1* | 7/2018 | Khlat | H01Q 25/50 |

OTHER PUBLICATIONS

David Pehlke et al., "LTE-Advanced Pro RF Front-End Implementations to Meet Emerging Carrier Aggregation and DL MIMO Requirements", IEEE Communications Magazine, Apr. 2017, pp. 134-141.

* cited by examiner

*Primary Examiner* — Kiet M Doan
(74) *Attorney, Agent, or Firm* — Lawrence J. Chapa

(57) ABSTRACT

The present application provides a radio frequency front end circuit, a wireless communication device and a method for coupling signals in support of multiple input and multiple output, and carrier aggregation for multiple frequency bands of operation between one or more transceivers and a plurality of antennas. Each antenna is associated with a respective signal from each of a first frequency band of operation and a second frequency band of operation from the one or more transceivers. The radio frequency front end circuit includes a multi-close front end switch associated with one of the plurality of antennas, where separate terminals of the multi-close front end switch are each respectively associated with the respective signal from each of the first frequency band of operation and the second frequency band of operation corresponding to the associated antenna from the one or more transceivers. The separate terminals of the multi-close front end switch can be simultaneously coupled to a port coupled to the associated antenna via multiple throws within the multi-close front end switch.

18 Claims, 5 Drawing Sheets

METHOD AND APPARATUS FOR COUPLING ONE OR MORE TRANSCEIVERS TO A PLURALITY OF ANTENNAS

FIELD OF THE APPLICATION

The present disclosure relates generally to the selective coupling of signals to one or more antennas, and more particularly, to the front end coupling of signals between one or more signal sources and a plurality of antennas.

BACKGROUND

Wireless communication devices are continuously integrating new and enhanced features, that leverage an ability to remotely transmit and receive data using wireless communication capabilities. As the features are added and/or enhanced, there often is a need to communicate wirelessly, an ever increasing amount of information/data in order to support the added and/or enhanced features of the device. This need for additional data throughput impacts both the overall operation of the network, as well as the data throughput relative to individual devices operating within the network.

The overall desire for higher data throughput for at least some cellular networks has led to at least some networks implementing support for Multiple Input Multiple Output (MIMO) forms of communication, including for example 4×4 MIMO relative to one or more bands of operation, while simultaneously supporting carrier aggregation. MIMO is a method for expanding the capacity of a radio link using multiple transmit and receive antennas, where multipath propagation properties are used to distinguish between different sets of signaling sent simultaneously over the same radio channel via separate antennas. MIMO is distinct from other throughput enhancement techniques developed to augment the performance of a propagated data signal, such as a beamforming signal processing technique and/or a multiple antenna diversity scheme. Carrier aggregation allows a number of separate carriers to be combined into a single data channel to enhance the data rates and data throughput capacity relative to a particular user.

While many prior communication techniques combined the performance of a pair of antennas in support of a communication connection, a 4×4 MIMO technique expands this requirement for multiple antennas in support of a communication connection even further, so as to include at least four antennas. Such an expansion in support of MIMO communications can be further complicated by the simultaneous implementation of carrier aggregation, which could further extend the operational requirements relative to at least some of the antennas to take into account a simultaneous operation involving signaling that potentially includes a broader range of frequencies.

At least some of the more recent implementations of Long Term Evolution (LTE) type cellular networks have expanded the type of possible communication connections to include 4×4 MIMO with carrier aggregation, where at least initially, the carrier aggregation involves both mid frequency bands (MB) and the high frequency bands (HB). LTE is a fourth generation mobile communication standard.

While the definition for the different bands are somewhat fluid, and can vary between different standards, and/or various implementations of the same standard, at least one exemplary approximation of the range of frequencies for each of the different bands includes a low band, which can include frequencies below 1400 MHz; a mid band, which can include frequencies between 1400 MHz and 2200 MHz; and a high band, which can include frequencies higher than 2200 MHz. These values and/or ranges are only exemplary approximations, and can change between systems and/or implementations. In some cases, an ultra low band and/or an ultra high band can also be further defined.

In addition to the multiple antennas needed to support various forms of communication, additional circuitry may also be needed to support the relaying of signals between the multiple antennas and the one or more receivers and/or transmitters. Examples of additional circuitry include switches, duplexers, diplexers, filters, and/or amplifiers, which can at least sometimes be associated with what in some instances can be referred to as radio frequency front end circuitry.

Because there can be a desire to limit the overall size of a user device, the implementation of the antennas and circuit elements, which support wireless communication can sometimes be a challenge. There is rarely a lot of extra space, so there can be a desire to the extent possible to implement the enhanced communication features while minimizing the amount of any additional circuitry or components. This can result in a preference for reusing antennas and circuit elements with as many types and/or forms of communication as possible. This can create a challenge as to the best way to map wireless communication signal paths between the one or more transceivers and the various antennas and/or radiating structures.

The present innovators have recognized that the use of switches, which allow for multiple throws to be simultaneously closed can be used to better facilitate the coupling of various sets of signals respectively associated with multiple different frequency bands of operation to a corresponding one of multiple antennas in support of carrier aggregation and MIMO operation. The present innovators have further recognized that in some instances, such a coupling can help to reduce the impact to other bands, while also reducing the instances in which adding additional antenna elements may be preferred.

SUMMARY

The present application provides a radio frequency front end circuit for coupling signals in support of multiple input and multiple output, and carrier aggregation for multiple frequency bands of operation between one or more transceivers and a plurality of antennas. Each antenna is associated with a respective signal from each of a first frequency band of operation and a second frequency band of operation from the one or more transceivers. The radio frequency front end circuit includes a multi-close front end switch associated with one of the plurality of antennas, where separate terminals of the multi-close front end switch are each respectively associated with the respective signal from each of the first frequency band of operation and the second frequency band of operation corresponding to the associated antenna from the one or more transceivers. The separate terminals of the multi-close front end switch can be simultaneously coupled to a port coupled to the associated antenna via multiple throws within the multi-close front end switch.

In at least one embodiment, the multi-close front end switch is included as part of a plurality of multi-close front end switches. Each one of the multi-close front end switches is respectively associated with one of the plurality of antennas, where separate terminals of each of the multi-close front end switches are each respectively associated with the respective signal from each of the first frequency band of operation and the second frequency band of operation corresponding to the associated antenna from the one or more transceivers. The separate terminals of each of the multi-close front end switches can be simultaneously coupled to a port coupled to the associated antenna via multiple throws within the associated multi-close front end switch.

The present application further provides a method in a radio frequency front end of a wireless communication device. The method includes coupling signals in support of multiple input and multiple output, and carrier aggregation for multiple frequency bands of operation between one or more transceivers and a plurality of antennas, where each antenna is associated with a respective signal from each of a first frequency band of operation and a second frequency band of operation from the one or more transceivers. A multi-close front end switch is associated with one of the plurality of antennas, where separate terminals of the multi-close front end switch are each respectively associated with the respective signal from each of the first frequency band of operation and the second frequency band of operation corresponding to the associated antenna from the one or more transceivers. The separate terminals of the multi-close front end switch are simultaneously coupled to a port coupled to the associated antenna via multiple throws within the multi-close front end switch.

The present invention still further provides a wireless communication device. The wireless communication device includes one or more transceivers, and a plurality of antennas. Each antenna is associated with a respective signal from each of a first frequency band of operation and a second frequency band of operation from the one or more transceivers. The wireless communication device further includes a radio frequency front end circuit for coupling signals in support of multiple input and multiple output, and carrier aggregation for multiple frequency bands of operation between the one or more transceivers and the plurality of antennas. The radio frequency front end circuit includes a multi-close front end switch associated with one of the plurality of antennas. Separate terminals of the multi-close front end switch are each respectively associated with the respective signal from each of the first frequency band of operation and the second frequency band of operation corresponding to the associated antenna from the one or more transceivers. The separate terminals of the multi-close front end switch can be simultaneously coupled to a port coupled to the associated antenna via multiple throws within the multi-close front end switch.

These and other features, and advantages of the present disclosure are evident from the following description of one or more preferred embodiments, with reference to the accompanying drawings.

DETAILED DESCRIPTION OF THE PREFERRED EMBODIMENT(S)

Figure 1:
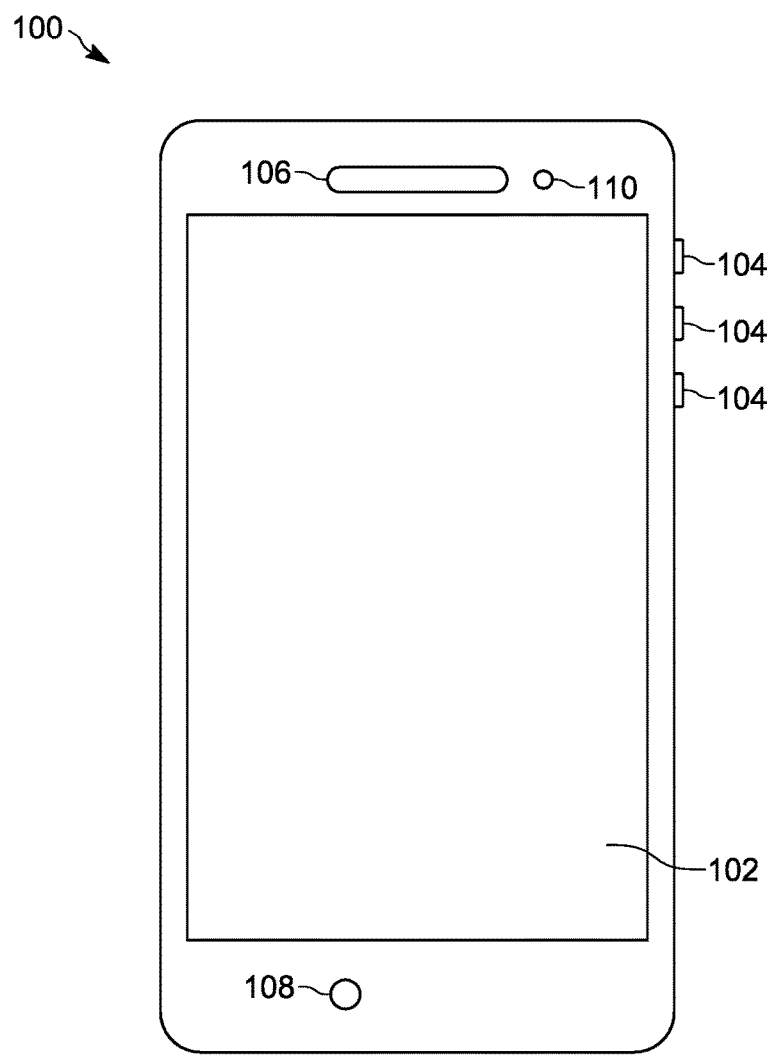
FIG. 1 is a front view of an exemplary wireless communication device.

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

FIG. 1 illustrates a front view of an exemplary wireless communication device 100. While in the illustrated embodiment, the type of wireless communication device shown is a radio frequency cellular telephone, other types of devices that include wireless radio frequency communication capabilities are also relevant to the present application. In other words, the present application is generally applicable to wireless communication devices beyond the type being specifically shown. A couple of additional examples of suitable wireless communication devices that may additionally be relevant to the present application in the selective coupling of signals from one or more transceivers to a plurality of antennas, including instances in which the selectively coupled signals support carrier aggregation and/or multiple input multiple output forms of communication, can include a tablet, a laptop computer, a desktop computer, a netbook, a cordless telephone, a selective call receiver, a gaming device, a personal digital assistant, as well as any other form of wireless communication device that might be used to manage multi-antenna and/or multiband forms of communication. The multi-antenna and/or multiband forms of communication could be used with one or more different communication standards. A few examples of different communication standards include Global System for Mobile Communications (GSM) Code Division Multiple Access (CDMA), Orthogonal Frequency Division Multiple Access (OFDMA), Long Term Evolution (LTE), Global Positioning System (GPS), Wi-Fi (IEEE 802.11), as well as various other communication standards. In addition, the wireless communication device 100 may utilize a number of additional various forms of communication and communication techniques including beamforming, signal diversity, and simultaneous voice and data that concurrently enables the use of simultaneous signal propagation.

In the illustrated embodiment, the radio frequency cellular telephone includes a display 102 which covers a large portion of the front facing. In at least some instances, the display can incorporate a touch sensitive matrix, that can help facilitate the detection of one or more user inputs relative to at least some portions of the display, including an interaction with visual elements being presented to the user via the display 102. In some instances, the visual element could be an object with which the user can interact. In other instances, the visual element can form part of a visual representation of a keyboard including one or more virtual keys and/or one or more buttons with which the user can interact and/or select for a simulated actuation. In addition to one or more virtual user actuatable buttons or keys, the device 100 can include one or more physical user actuatable buttons 104. In the particular embodiment illustrated, the device has three such buttons located along the right side of the device.

The exemplary hand held electronic device, illustrated in FIG. 1, additionally includes a speaker 106 and a microphone 108 in support of voice communications.

The speaker 106 may additionally support the reproduction of an audio signal, which could be a stand-alone signal, such as for use in the playing of music, or can be part of a multimedia presentation, such as for use in the playing of a movie, which might have at least an audio as well as a visual component. The speaker may also include the capability to also produce a vibratory effect. However, in some instances, the purposeful production of vibrational effects may be associated with a separate element, not shown, which is internal to the device. Generally, the speaker is located toward the top of the device, which corresponds to an orientation consistent with the respective portion of the device facing in an upward direction during usage in support of a voice communication. In such an instance, the speaker 106 might be intended to align with the ear of the user, and the microphone 108 might be intended to align with the mouth of the user. Also located near the top of the device, in the illustrated embodiment, is a front facing camera 110. The wireless communication device will also generally include one or more radio frequency transceivers, as well as associated transmit and receive circuitry, including one or more antennas that may be positioned internally relative to the device. In some instances, some or all of the antenna elements may also and/or alternatively be incorporated as part of the housing of the device.

Figure 2:
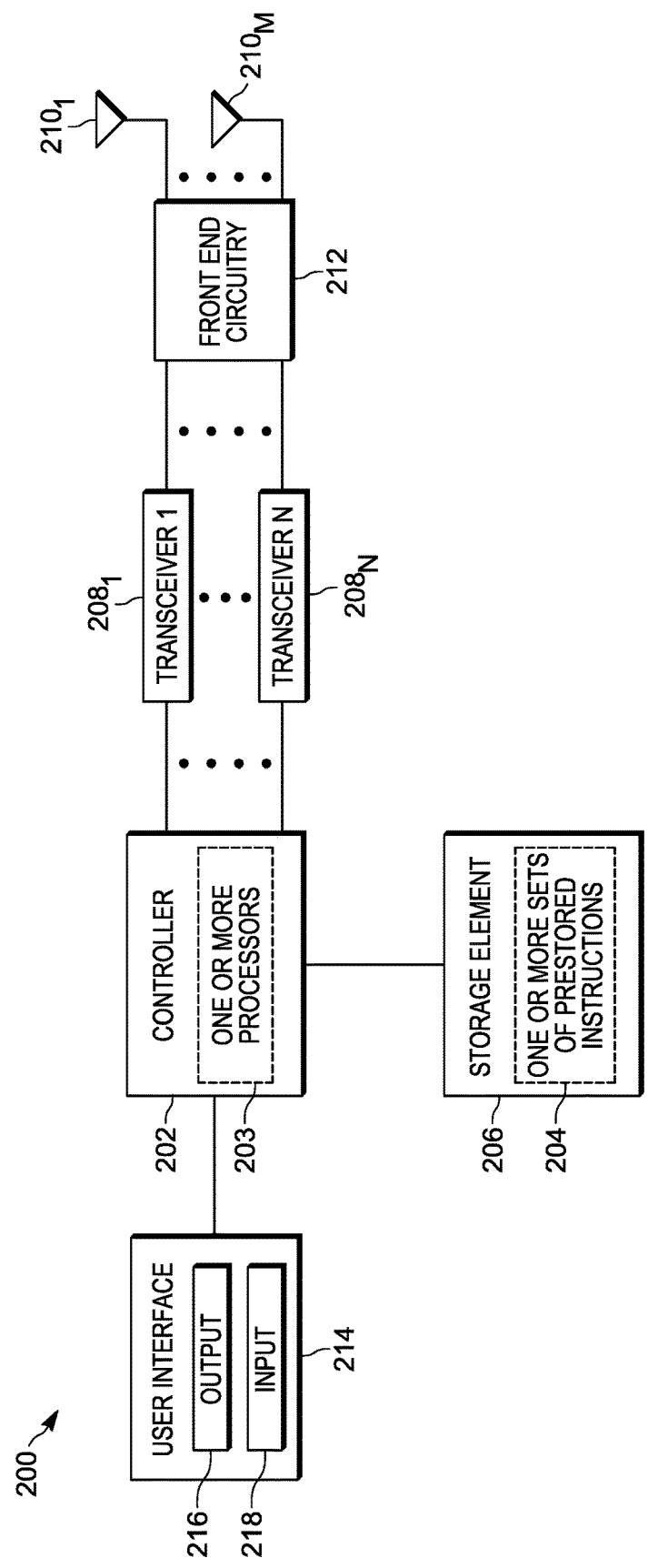
FIG. 2 is a block diagram of a wireless communication device.

FIG. 2 illustrates a block diagram 200 of a wireless communication device 100, in accordance with at least one embodiment. In the illustrated embodiment, the wireless communication device 100 includes a controller 202, which is adapted for managing at least some of the operation of the device 100. In some embodiments, the controller 202 could be implemented in the form of one or more processors 203, which are adapted to execute one or more sets of pre-stored instructions 204, which may be used to form or implement the operation of at least part of one or more controller modules including those used to manage wireless communication and/or the coupling of wireless communication signals to one or more antennas. The one or more sets of pre-stored instructions 204 may be stored in a storage element 206, which while shown as being separate from and coupled to the controller 202, may additionally or alternatively include some data storage capability for storing at least some of the prestored instructions for use with the controller 202, that are integrated as part of the controller 202.

The storage element 206 could include one or more forms of volatile and/or non-volatile memory, including conventional ROM, EPROM, RAM, or EEPROM. The possible additional data storage capabilities may also include one or more forms of auxiliary storage, which is either fixed or removable, such as a hard drive, a floppy drive, or a memory card or stick. One skilled in the art will still further appreciate that still other further forms of storage elements could be used without departing from the teachings of the present disclosure. In the same or other instances, the controller 202 may additionally or alternatively incorporate state machines and/or logic circuitry, which can be used to implement at least partially, some of the modules and/or functionality associated with the controller 202.

In the illustrated embodiment, the device further includes one or more transceivers $208_1$-$208_N$, which are coupled to the controller 202 and which serve to manage the external communication of data including their wireless communication using one or more forms of communications. In such an instance, the transceivers will generally be coupled to one or more antennas $210_1$-$210_M$, via which the wireless communication signals will be radiated and received. For example, the one or more transceivers 208 might include a receiver for supporting communications with a global positioning system, one or more transceivers for supporting cellular radio frequency communications, a transceiver for supporting Bluetooth® type communications, as well as a transceiver for supporting Wi-Fi® type communications. Transceivers, receivers and/or transmitters for other forms of communication are additionally and/or alternatively possible. While in some instances each transceiver can be associated with a separate antenna, it is envisioned that in the present instance an antenna may be able to support multiple transceivers and/or multiple forms of communication, and that some transceivers may interact with multiple antennas. In the present instance, the one or more transceivers $208_1$-$208_N$ are coupled to a plurality of antennas $210_1$-$210_M$ via front end circuitry 212, which can help to facilitate the one or more transceivers 208 interacting with the multiple antennas 210.

More specifically, the front end circuitry 212 is intended to allow one or more transceiver ports to be selectively coupled to the multiple ports associated with the various antenna elements. The front end circuitry 212 can further serve to help associate various disparate sets of frequencies with each of the multiple ports, such that the transceivers can simultaneously operate while reducing the risk that signals associated with a particular transceiver will negatively impact signals intended for use with another transceiver. This can be facilitated through the use of one or more filters, diplexers, duplexers and switches, which are incorporated as part of the front end circuitry 212. The front end circuitry 212 can further include impedance matching elements, and/ or signal amplifiers, so as to more effectively manage the conveyance of signals between the transceivers and the antenna elements.

In the illustrated embodiment, the device 100 can additionally include user interface circuitry 214, some of which can be associated with producing an output 216 to be perceived by the user, and some of which can be associated with detecting an input 218 from the user. For example, the user interface circuitry 214 can include a display 102 adapted for producing a visually perceptible output, which may further support a touch sensitive array for receiving an input from the user. The user interface circuitry may also include a speaker 106 for producing an audio output, and a microphone 108 for receiving an audio input. The user interface output 216 could further include a vibrational element. The user interface input 218 could further include one or more user actuatable switches 104, one or more sensors, as well as one or more cameras 110. Still further alternative and additional forms of user interface elements may be possible.

Figure 3:
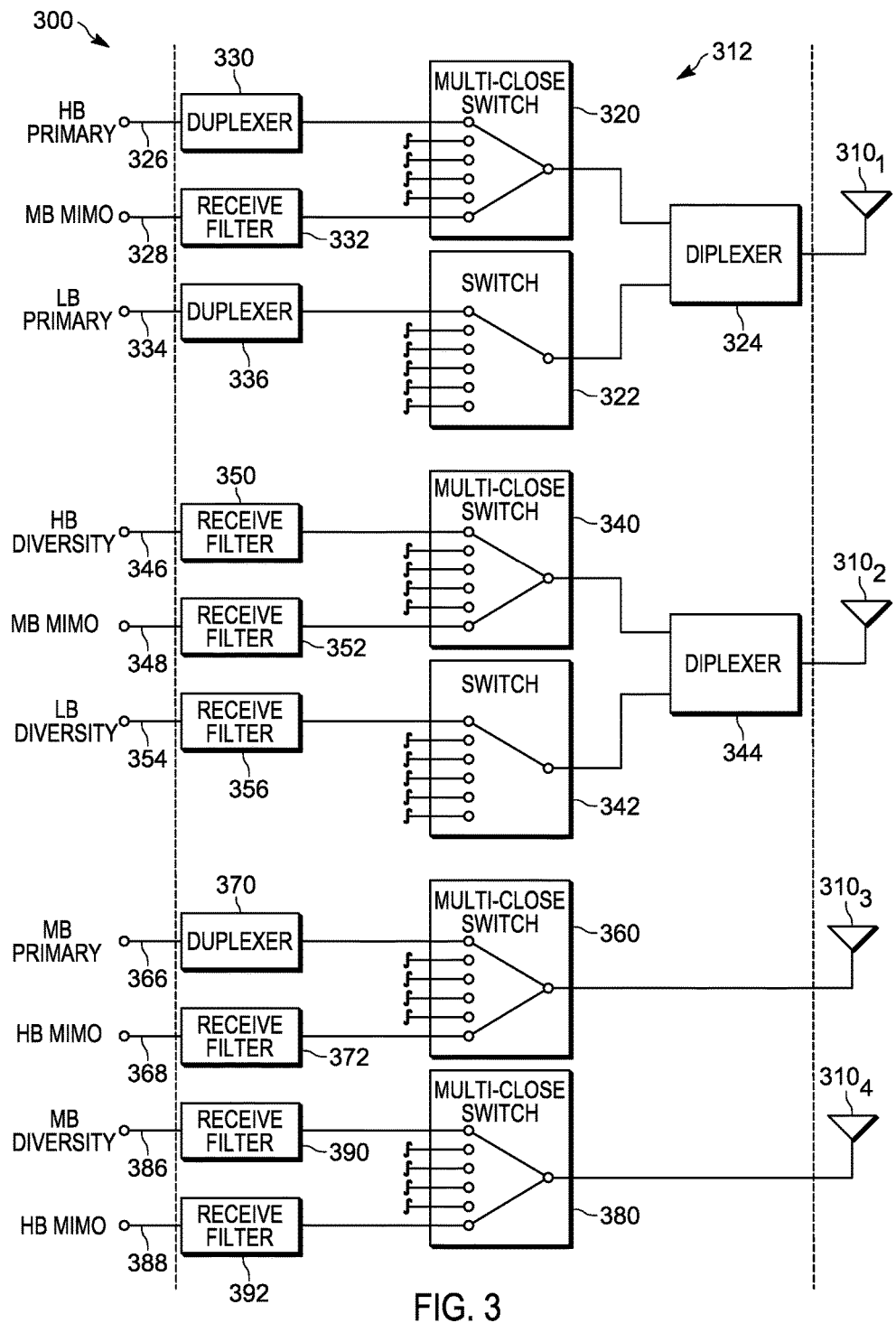
FIG. 3 is a block diagram of a radio frequency front end circuit for coupling one or more transceivers to a plurality of antennas.

FIG. 3 illustrates a block diagram 300 of a radio frequency front end circuitry 312 for coupling one or more transceivers to a plurality of antennas, which can include support for multiple input and multiple output (MIMO) signaling, as well as carrier aggregation. In the illustrated embodiment, the circuitry 312 includes support for 4×4 MIMO. The particular form of MIMO will often dictate the number of antennas needed to support the particular version.

In this case 4×4 generally indicates four receive antennas and four transmit antennas, which can be used to transmit and decode a corresponding number of unique data streams. Furthermore, in the particular embodiment illustrated, the radio front end circuitry 312 can support 4×4 MIMO for a carrier aggregated signal involving a set of frequencies in each of a high band frequency range and a mid band frequency range.

In order to support 4×4 MIMO in each of the respective bands, the ability to couple a corresponding signal to each of the four antennas in each of the high band and the mid band would be appropriate. More specifically, each of the four respective antennas are coupled to each of a primary signal, a diversity signal, and two additional MIMO signals for each of the bands of interest. The present embodiment allows for the same antennas being used to support MIMO for the high band to also be used to support MIMO for the mid band. In the illustrated embodiment, while a low band MIMO is not being shown, the present embodiment could be readily extended to additionally and/or alternatively support a low band MIMO, through the provisions for two additional low band signals relative to, in each case a selective coupling to the additionally shown and/or not shown antennas, which are not currently being used with a low band connection.

In the particular embodiment illustrated, the radio frequency front end circuitry includes a multi-close switch, which supports coupling two separately received signal feeds to a common output port through the use of a switch, which supports multiple simultaneous throws. By using a multi-close switch, the use of a duplexer that combines a still greater number of signals relative to one of the signal feeds of the switch can be avoided. Still further a solution that reuses the same four antennas is also possible. Higher order diplexers, such as a quadplexer, can often have a disproportionate increase in cost, as well as a higher signal loss. Still further, quadplexers can also often provide support for very specific frequency combinations, which can make their adaptation to still further alternative combinations of carrier aggregation sometimes problematic.

In the illustrated embodiment 300, a first antenna $310_1$ is coupled to the outputs of a pair of switches 320 and 322 via a diplexer 324, one of the switches 320 being a multi-close switch and the other switch 322 being a single close switch. The multi-close switch 320 has at least a pair of input terminals respectively associated with a high band primary signal feed 326 and a mid band MIMO signal feed 328. The high band primary signal feed 326 is coupled to the corresponding input terminal of the multi-close switch 320 via a duplexer 330. The duplexer 330 supports a high band primary signal feed that supports both a receive channel and a transmit channel. In the illustrated embodiment, the receive channel is associated with each of the four related frequency band signal feeds, while the transmit channel is only associated with the corresponding frequency band primary signal feed. Correspondingly, the mid band MIMO signal feed 328 is coupled to the corresponding input terminal of the multi-close switch 320 via a receive filter 332. While not shown, the still further input terminals of the multi-close switch 320 can be coupled to convey still further signal feeds, which might be related to the same type, a similar type, and/or different type of still further wireless radio frequency communications. The low band primary signal feed 334 is coupled to an input terminal of the single close switch 322 via a duplexer 336 for similarly supporting both a related receive channel and a transmit channel.

A second antenna $310_2$ is coupled to the respective outputs of a second pair of switches 340 and 342 via a diplexer 344. Switch 340, in the illustrated embodiment, is a multi-close switch, which has a pair of input terminals respectively associated with a high band diversity signal feed 346 and a separate mid band MIMO signal feed 348. Each of the high band diversity signal feed 346 and the separate mid band MIMO signal feed 348 are coupled to a corresponding one of the pair of input terminals via a respective receive filter 350 and 352. Switch 342, in the illustrated embodiment, is a single close switch, which has an input terminal that is coupled to a low band diversity signal feed 354 via a receive filter 356.

A third antenna $310_3$ is coupled to the output of multi-close switch 360. The multi-close switch 360 has a pair of input terminals, which are respectively coupled to a mid band primary signal feed 366 and a high band MIMO signal feed 368. The mid band primary signal feed 366 is coupled to the corresponding input terminal of the multi-close switch 360 via a duplexer 370, which supports both a transmit channel and a receive channel. The high band MIMO signal feed 368 is coupled to the corresponding input terminal of the multi-close switch 360 via a receive filter 372.

A fourth antenna $310_4$ is coupled to the output of multi-close switch 380. The multi-close switch 380 has a pair of input terminals, which are respectively coupled to a mid band diversity signal feed 386 and a high band MIMO signal feed 388. The mid band diversity signal feed 386 is coupled to the corresponding input terminal of the multi-close switch 380 via a receive filter 390. The high band MIMO signal feed 388 is coupled to the corresponding input terminal of the multi-close switch 380 via a receive filter 392. In this way, the same four antennas can be used to support a 4×4 MIMO with carrier aggregation, as well as a separate low band communication connection.

Figure 4:
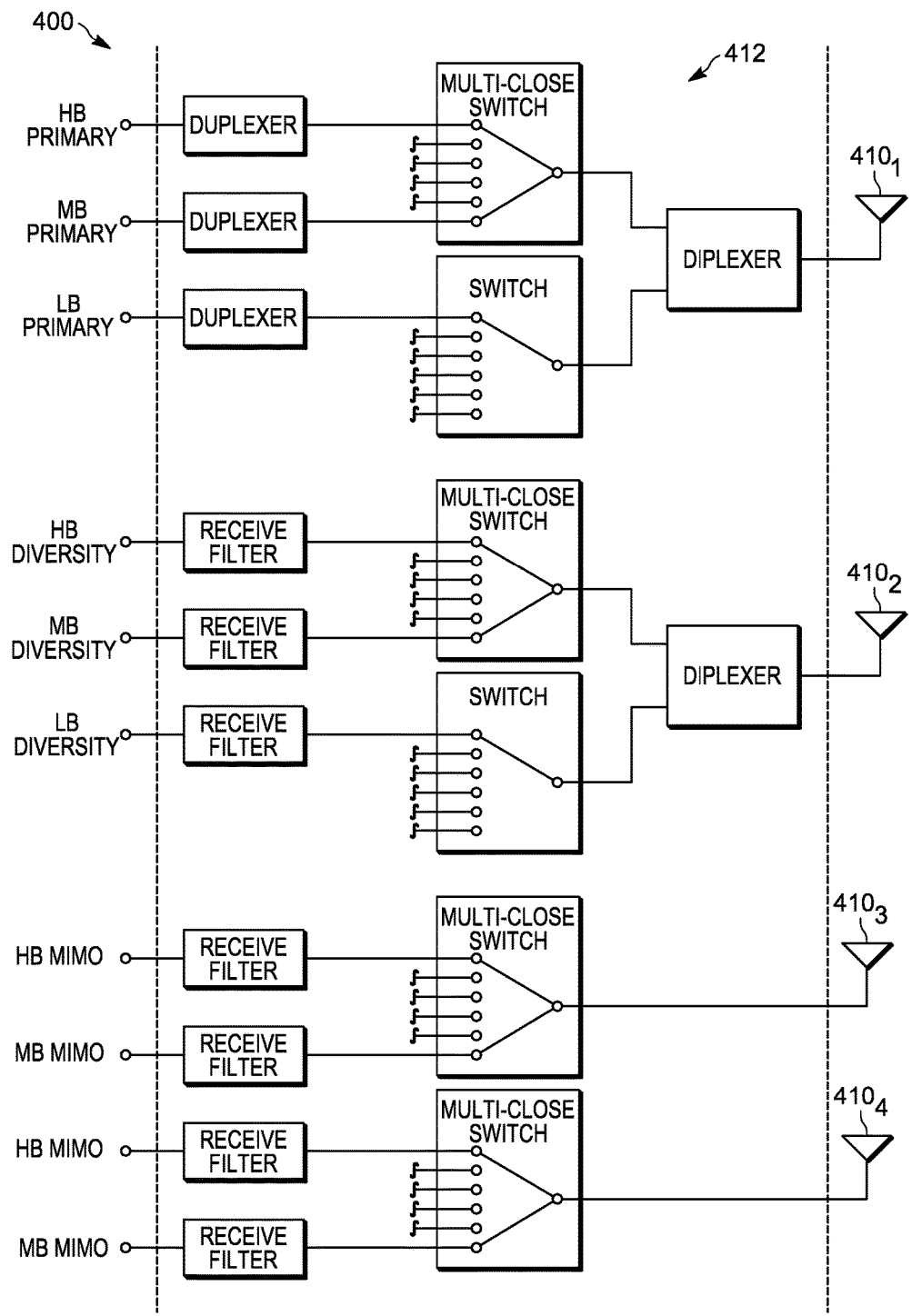
FIG. 4 is a block diagram of a radio frequency front end circuit for coupling one or more transceivers to a plurality of antennas, in accordance with a further embodiment.

FIG. 4 illustrates a block diagram 400 of a radio frequency front end circuitry 412 for coupling signal feeds for one or more transceivers to a plurality of antennas, in accordance with a further embodiment. The alternative embodiment is similar to the embodiment illustrated in FIG. 3, with the exception that some of the signaling related to the mid band has been rearranged relative to the respective antennas. Correspondingly, the duplexer which is used with the mid band primary signal feed has similarly been rearranged. More specifically, in this embodiment, all of the primary signal feeds relative to each of the bands have been grouped relative to the first antenna $410_1$, as well as all of the duplexers. All of the diversity signal feeds relative to each of the bands have been grouped relative to the second antenna $410_2$. Conversely, the third and the fourth antennas are each associated with a respective set of MIMO signals to the extent that MIMO signals exist for each of the different signal bands. Still further rearrangements are also possible without departing from the teachings of the present application.

By using switches that can close multiple throws, simultaneously, as part of a 4×4 MIMO operation, the arrangement of the signal routing circuitry can be streamlined, and avoid duplexers that manage the grouping of greater numbers of signal feeds, such as quadplexers. This is also the case for MIMO operation in a carrier aggregation environment. Furthermore, when 4×4 MIMO operation is not needed or desired, the multi-close switch can operate to close only a single throw, providing still further flexibility in coupling signal feeds to the appropriate antennas. Such an implementation may help reduce the overall number of antenna being used for supporting the various wireless radio frequency usage configurations. Still further, such a configuration will support 4×4 MIMO even where MIMO operation in only a single band is desired. In such an instance, restricting the multi-close switch to the closing of a single throw may be sufficient to support the desired operation.

Figure 5:
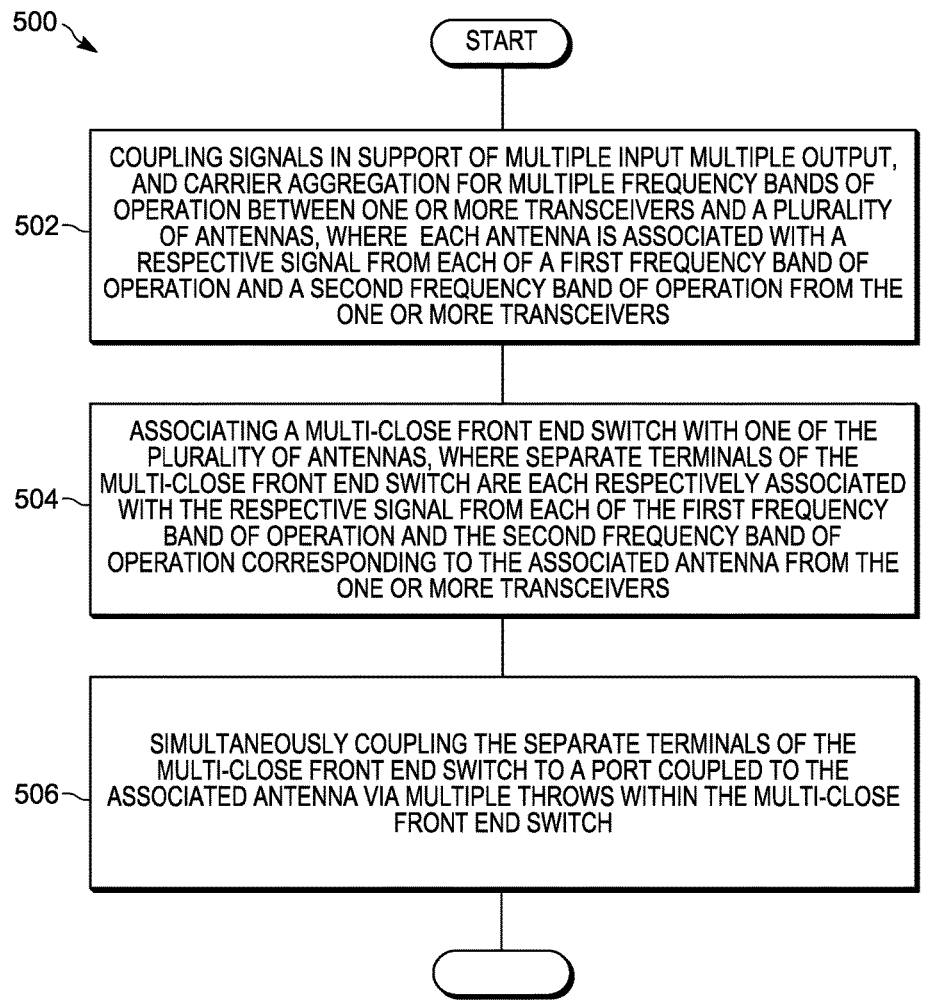
FIG. 5 is a flow diagram of a method for coupling one or more transceivers to a plurality of antennas.

FIG. 5 illustrates a flow diagram 500 of a method in a radio frequency front end of a wireless communication device. The method 500 includes coupling 502 signals in support of multiple input and multiple output, and carrier aggregation for multiple frequency bands of operation between one or more transceivers and a plurality of antennas, where each antenna is associated with a respective signal from each of a first frequency band of operation and a second frequency band of operation from the one or more transceivers. A multi-close front end switch is associated 504 with one of the plurality of antennas, where separate terminals of the multi-close front end switch are each respectively associated with the respective signal from each of the first frequency band of operation and the second frequency band of operation corresponding to the associated antenna from the one or more transceivers. The separate terminals of the multi-close front end switch are simultaneously coupled 506 to a port coupled to the associated antenna via multiple throws within the multi-close front end switch.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A radio frequency front end circuit for coupling signals in support of multiple input and multiple output, and carrier aggregation for multiple frequency bands of operation between one or more transceivers and a plurality of antennas, where each antenna is associated with a respective signal from each of a first frequency band of operation and a second frequency band of operation from the one or more transceivers, the radio frequency front end circuit comprising:
 a multi-close front end switch associated with one of the plurality of antennas, where separate terminals of the multi-close front end switch are each respectively associated with the respective signal from each of the first frequency band of operation and the second frequency band of operation corresponding to the associated antenna from the one or more transceivers, and where the separate terminals of the multi-close front end switch can be simultaneously coupled to a port coupled to the associated antenna via multiple throws within the multi-close front end switch; and
 wherein at least one of the plurality of antennas is additionally associated with a respective signal from a third frequency band of operation;
 wherein each of the plurality of antennas additionally associated with a respective signal from a third frequency band of operation is associated with an additional front end switch in addition to the associated multi-close front end switch, the respective signal from the third frequency band of operation is coupled to a terminal of the additional front end switch, which can be coupled to a port of the additional front end switch via a throw within the additional front end switch; and
 wherein the port associated with the additional front end switch and the port associated with the multi-close front end switch are each coupled to the associated antenna via a diplexer.

2. A radio frequency front end circuit in accordance with claim 1, wherein the first frequency band of operation is a high frequency band.

3. A radio frequency front end circuit in accordance with claim 1, wherein the second frequency band of operation is a medium frequency band.

4. A radio frequency front end circuit in accordance with claim 1, wherein the carrier aggregation includes a set of frequencies from the first frequency band of operation, and a set of frequencies from the second frequency band of operation.

5. A radio frequency front end circuit in accordance with claim wherein the third frequency band of operation is a low frequency band.

6. A radio frequency front end circuit in accordance with claim 1, wherein the multi-close front end switch is included as part of a plurality of multi-close front end switches, each one of the multi-close front end switches being respectively associated with one of the plurality of antennas, where separate terminals of each of the multi-close front end switches are each respectively associated with the respective signal from each of the first frequency band of operation and the second frequency band of operation corresponding to the associated antenna from the one or more transceivers, and where the separate terminals of each of the multi-close front end switches can be simultaneously coupled to a port coupled to the associated antenna via multiple throws within the associated multi-close front end switch.

7. A radio frequency front end circuit in accordance with claim 1, wherein the plurality of antennas includes four antennas in support of 4×4 multiple input and multiple output (MIMO).

8. A radio frequency front end circuit in accordance with claim 7, wherein each of the four antennas are associated with a respective one of a primary receiver path, a secondary receiver path, a tertiary receiver path, and a quaternary receiver path for each of the first frequency band of operation and the second frequency band of operation.

9. A radio frequency front end circuit in accordance with claim 8, wherein the primary receiver path for each of the frequency bands of operation includes a set of frequencies within the respective frequency band of operation in support of transmitting a signal, and a set of frequencies within the respective frequency band of operation in support of receiving a signal.

10. A radio frequency front end circuit in accordance with claim 8, wherein the set of frequencies associated with each of the secondary receiver path, the tertiary receiver path, and the quaternary receiver path for receiving a signal in at least one of one or more transceivers are coupled to a respective one of the terminals of the associated multi-close front end switch via a receive filter.

11. A radio frequency front end circuit in accordance with claim 8, wherein the primary receiver path and the secondary receiver path of the first frequency band of operation is respectively associated with a first one and a second one of the four antennas, and wherein the primary receiver path and the secondary receiver path of the second frequency band of operation is respectively associated with a third one and a fourth one of the four antennas.

12. A radio frequency front end circuit in accordance with claim 8, wherein the primary receiver path of the first frequency band of operation and the primary receiver path of the second frequency band of operation is associated with a first one of the four antennas, and wherein the secondary receiver path of the first frequency band of operation and the secondary receiver path of the second frequency band of operation is associated with a second one of the four antennas.

13. A radio frequency front end circuit in accordance with claim 1, wherein the radio frequency front end circuit is incorporated as part of a wireless communication device.

14. A radio frequency front end circuit for coupling signals in support of multiple input and multiple output, and carrier aggregation for multiple frequency bands of operation between one or more transceivers and a plurality of antennas, where each antenna is associated with a respective signal from each of a first frequency band of operation and a second frequency band of operation from the one or more transceivers, the radio frequency front end circuit comprising:
 a multi-close front end switch associated with one of the plurality of antennas, where separate terminals of the multi-close front end switch are each respectively associated with the respective signal from each of the first frequency band of operation and the second frequency band of operation corresponding to the associated antenna from the one or more transceivers, and where the separate terminals of the multi-close front end switch can be simultaneously coupled to a port coupled to the associated antenna via multiple throws within the multi-close front end switch;
 wherein the plurality of antennas includes four antennas in support of 4×4 multiple input and multiple output (MIMO);
 wherein each of the four antennas are associated with a respective one of a primary receiver path, a secondary receiver path, a tertiary receiver path, and a quaternary receiver path for each of the first frequency band of operation and the second frequency band of operation;
 wherein the primary receiver path for each of the frequency bands of operation includes a set of frequencies within the respective frequency band of operation in support of transmitting a signal, and a set of frequencies within the respective frequency band of operation in support of receiving a signal; and
 wherein the set of frequencies associated with the primary receiver path for each of transmitting a signal and receiving a signal in at least one of one or more transceivers are commonly coupled to one of the terminals of the associated multi-close front end switch via a duplexer.

15. A radio frequency front end circuit for coupling signals in support of multiple input and multiple output, and carrier aggregation for multiple frequency bands of operation between one or more transceivers and a plurality of antennas, where each antenna is associated with a respective signal from each of a first frequency band of operation and a second frequency band of operation from the one or more transceivers, the radio frequency front end circuit comprising:
 a multi-close front end switch associated with one of the plurality of antennas, where separate terminals of the multi-close front end switch are each respectively associated with the respective signal from each of the first frequency band of operation and the second frequency band of operation corresponding to the associated antenna from the one or more transceivers, and where the separate terminals of the multi-close front end switch can be simultaneously coupled to a port coupled to the associated antenna via multiple throws within the multi-close front end switch;
 wherein the plurality of antennas includes four antennas in support of 4×4 multiple input and multiple output (MIMO);
 wherein each of the four antennas are associated with a respective one of a primary receiver path, a secondary receiver path, a tertiary receiver path, and a quaternary receiver path for each of the first frequency band of operation and the second frequency band of operation;
 wherein the primary receiver path and the secondary receiver path of the first frequency band of operation is respectively associated with a first one and a second one of the four antennas, and wherein the primary receiver path and the secondary receiver path of the second frequency band of operation is respectively associated with a third one and a fourth one of the four antennas; and
 wherein the tertiary receiver path and the quaternary receiver path of the second frequency band of operation is respectively associated with a first one and a second one of the four antennas, and wherein the tertiary receiver path and the quaternary receiver path of the first frequency band of operation is respectively associated with a third one and a fourth one of the four antennas.

16. A radio frequency front end circuit for coupling signals in support of multiple input and multiple output, and carrier aggregation for multiple frequency bands of operation between one or more transceivers and a plurality of antennas, where each antenna is associated with a respective signal from each of a first frequency band of operation and a second frequency band of operation from the one or more transceivers, the radio frequency front end circuit comprising:
 a multi-close front end switch associated with one of the plurality of antennas, where separate terminals of the multi-close front end switch are each respectively associated with the respective signal from each of the first frequency band of operation and the second frequency band of operation corresponding to the associated antenna from the one or more transceivers, and where the separate terminals of the multi-close front end switch can be simultaneously coupled to a port coupled to the associated antenna via multiple throws within the multi-close front end switch;
 wherein the plurality of antennas includes four antennas in support of 4×4 multiple input and multiple output (MIMO);
 wherein each of the four antennas are associated with a respective one of a primary receiver path, a secondary receiver path, a tertiary receiver path, and a quaternary receiver path for each of the first frequency band of operation and the second frequency band of operation;
 wherein the primary receiver path of the first frequency band of operation and the primary receiver path of the second frequency band of operation is associated with a first one of the four antennas, and wherein the secondary receiver path of the first frequency band of operation and the secondary receiver path of the second frequency band of operation is associated with a second one of the four antennas; and
 wherein the tertiary receiver path of the first frequency band of operation and the tertiary receiver path of the second frequency band of operation is associated with a third one of the four antennas, and wherein the quaternary receiver path of the first frequency band of operation and the quaternary receiver path of the second frequency band of operation is associated with a fourth one of the four antennas.

17. A method in a radio frequency front end of a wireless communication device, the method comprising:
coupling signals in support of multiple input and multiple output, and carrier aggregation for multiple frequency bands of operation between one or more transceivers and a plurality of antennas, where each antenna is associated with a respective signal from each of a first frequency band of operation and a second frequency band of operation from the one or more transceivers;
associating a multi-close front end switch with one of the plurality of antennas, where separate terminals of the multi-close front end switch are each respectively associated with the respective signal from each of the first frequency band of operation and the second frequency band of operation corresponding to the associated antenna from the one or more transceivers;
simultaneously coupling the separate terminals of the multi-close front end switch to a port coupled to the associated antenna via multiple throws within the multi-close front end switch;
additionally associating with each of the plurality of antennas a respective signal from a third frequency band of operation via an additional front end switch in addition to the associated multi-close front end switch, the respective signal from the third frequency band of operation is coupled to a terminal of the additional front end switch, which can be coupled to a port of the additional front end switch via a throw within the additional front end switch; and
wherein the port associated with the additional front end switch and the port associated with the multi-close front end switch are each coupled to the associated antenna via a diplexer.

18. A wireless communication device comprising:
one or more transceivers;
a plurality of antennas, where each antenna is associated with a respective signal from each of a first frequency band of operation and a second frequency band of operation from the one or more transceivers; and
a radio frequency front end circuit for coupling signals in support of multiple input and multiple output, and carrier aggregation for multiple frequency bands of operation between the one or more transceivers and the plurality of antennas, the radio frequency front end circuit including
a multi-close front end switch associated with one of the plurality of antennas, where separate terminals of the multi-close front end switch are each respectively associated with the respective signal from each of the first frequency band of operation and the second frequency band of operation corresponding to the associated antenna from the one or more transceivers, and where the separate terminals of the multi-close front end switch can be simultaneously coupled to a port coupled to the associated antenna via multiple throws within the multi-close front end switch; and
wherein at least one of the plurality of antennas is additionally associated with a respective signal from a third frequency band of operation;
wherein each of the plurality of antennas additionally associated with a respective signal from a third frequency band of operation is associated with an additional front end switch in addition to the associated multi-close front end switch, the respective signal from the third frequency band of operation is coupled to a terminal of the additional front end switch, which can be coupled to a port of the additional front end switch via a throw within the additional front end switch; and
wherein the port associated with the additional front end switch and the port associated with the multi-close front end switch are each coupled to the associated antenna via a diplexer.

* * * * *